Aug. 14, 1962

E. R. PRICE 3,049,099

REACTION PRODUCING STRUCTURE

Filed June 30, 1959

2 Sheets-Sheet 1

INVENTOR.
EARL R. PRICE
BY
William P. Hickey
ATTORNEY 3,049,099
REACTION PRODUCING STRUCTURE
Earl R. Price, South Bend, Ind., assignor to The Bendix Corporation, a corporation of Delaware
Filed June 30, 1959, Ser. No. 824,069
6 Claims. (Cl. 121—41)

The present invention relates, as indicated, to an improved reaction producing structure; and more particularly to an improved servomotor in which the manual control member can physically move the driven element during power failure.

An object of the present invention is the provision of a new and improved reaction producing structure for servomotors and the like in which a block of rubber-like material is compressed between the motor's power actuated structure and its driven element during power actuation, and in which the unit's control element is axially aligned for abutment with the rubber-like material to provide reaction to the control element—the servomotor further including a projection on one of said elements which normally projects at least part way through the rubber-like material in such manner as to abut the other element only during manual actuation of the servomotor.

A further object of the invention is the provision of new and improved reaction means of the above described type in which said projection extends through the rubber-like material and is received in an opening in the other element.

Figure 1:
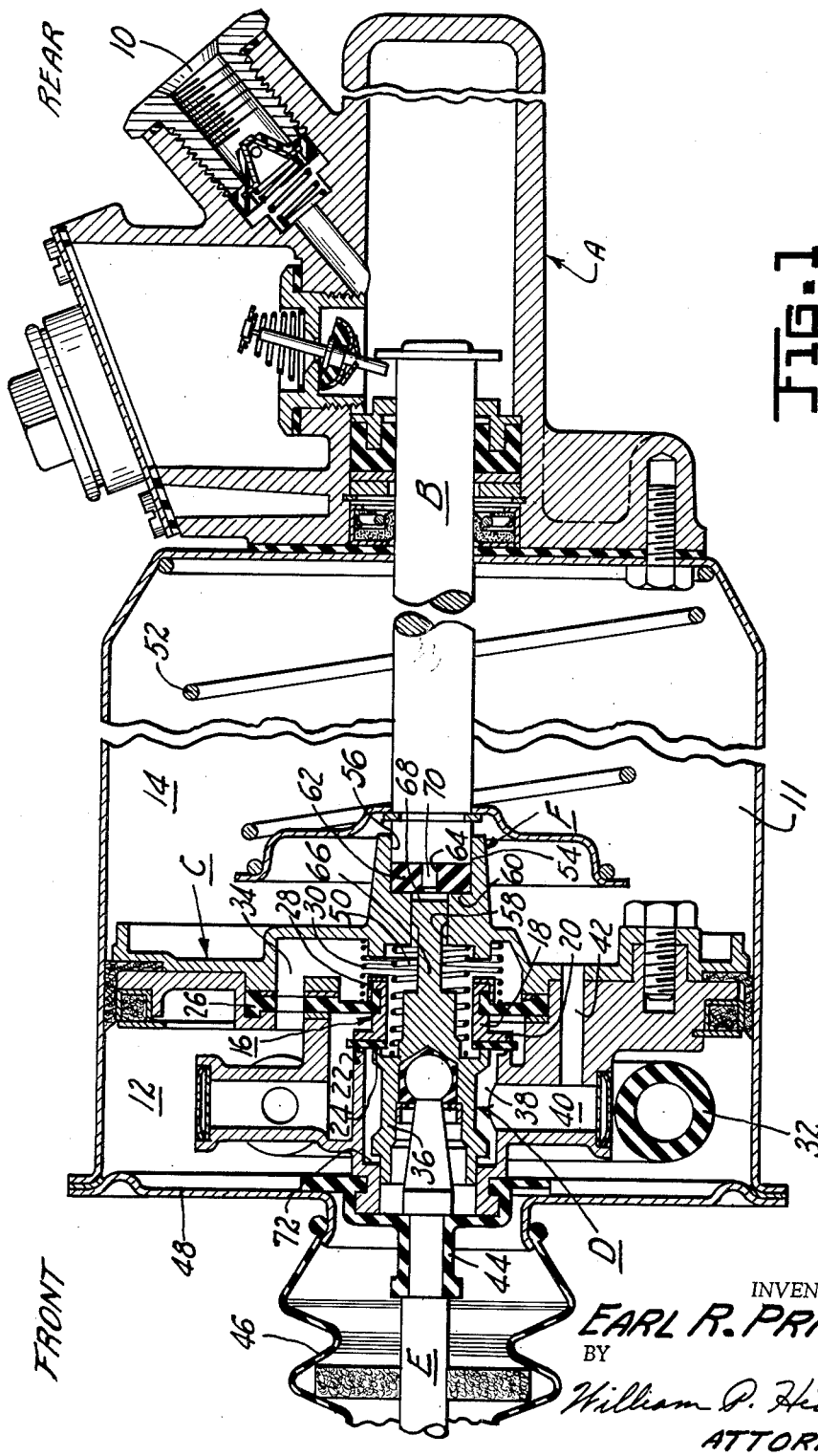
Figure 2:
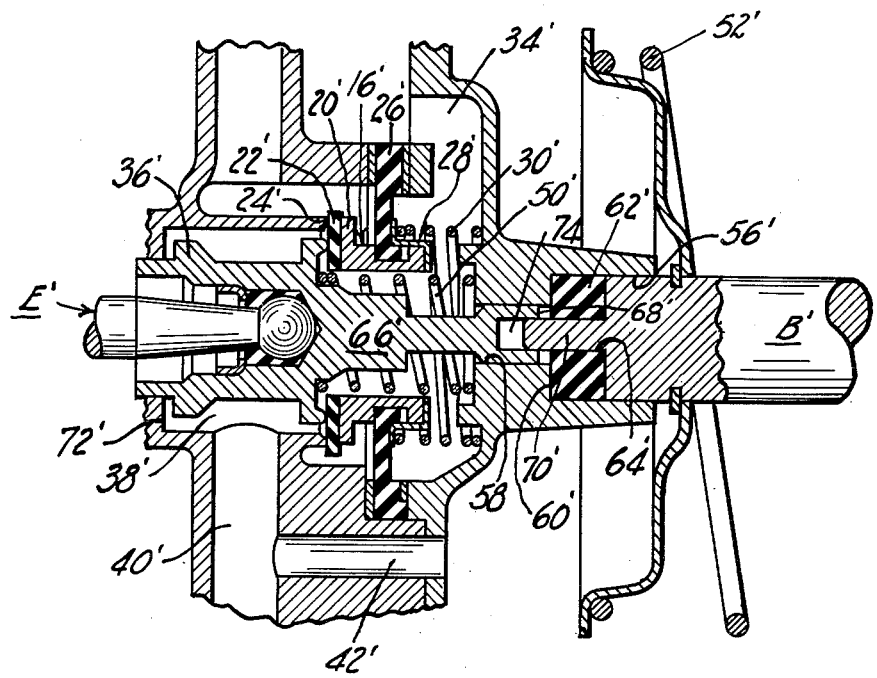

The invention resides in certain constructions and combinations and arrangements of parts; and further objects and advantages will become apparent to those skilled in the art to which the invention relates from the following description of the preferred embodiment described with reference to the accompanying drawings forming a part of this specification, and in which:

FIGURE 1 is a cross sectional view of a servomotor driven master cylinder of the type used to operate the braking system of an automotive vehicle, and which incorporates principles of the present invention; and FIGURE 2 is a fragmentary cross sectional view of a servomotor similar to that shown in FIGURE 1, but showing a slightly different embodiment of the reaction producing structure.

The power operated master cylinder shown in FIGURE 1, generally comprises a fluid pressurizing device A having an outlet connection 10 that is normally connected to the wheel cylinders of an automotive braking system. Fluid is normally displaced from the fluid pressurizing device A by a displacement plunger B which in turn is driven by the piston or power operated member C of the unit's fluid pressure servomotor. Power piston C divides the internal chamber 11 of the servomotor into a front opposing chamber 12, into which atmospheric pressure is continually communicated through an air filter (not shown), and a rear opposing chamber 14, into which vacuum from the vehicle's propelling engine is admitted in order to actuate the servomotor. Control of the pressure on the back opposing chamber 14 is had by means of a control valve structure D that is carried by the power piston C; and the control valve structure D is in turn actuated by a manually movable control rod E.

The power piston C is formed in front and rear half sections which are suitably bolted together in order to form the passages and chambers of the control valve structure D. The control valve structure D includes an annular poppet structure indicated generally by the numeral 16 which is formed by a metallic generally tubular center portion 18 having a radially turned flange 20 on its front end. The flange 20 is provided with a rubber surface for sealing engagement with the vacuum valve seat 22 and the atmospheric valve seat 24. The annular poppet structure 16 is completed by a flexible rear flange or diaphragm 26 made from synthetic rubber and the center portion of which is clamped to the tubular portion 18 by a cup-shaped washer 28. The outer portion of the diaphragm 26 is clamped between the front and rear sections of the power piston C. The annular poppet structure 16 is normally biased into engagement with the vacuum valve seat 22 by a coil spring 30; and vacuum is continually fed to the vacuum valve seat 22 and the portion of the poppet structure 16 between the flanges 20 and 26 by a flexible rubber conduit 32 which extends outwardly of the servomotor.

As previously indicated, atmospheric pressure is continually communicated to the front opposing power chamber 12 and atmospheric pressure from the power chamber 12 is continually communicated by means of passageway 34 in the power piston C to the area rearwardly of the annular poppet structure 16. The control valve structure D is completed by a manually actuated generally spool-shaped control member 36 whose front end portion is suitably guided in the front half section of the power piston C, and the rear flanged portion of which is provided with the atmospheric valve seat 24 for engagement with the front flange 20 of the annular poppet structure 16. When the atmospheric valve seat 22 is in engagement with the front flange 20, the atmospheric passages 34 of the control valve structure are isolated from the valve's control chamber 38, which lies in the region between the atmospheric valve seat 24 and vacuum valve seat 22, and the control chamber 38 is in turn continually communicated with the rear opposing power chamber 14 by the control passages 40 and 42 formed in the sections in the power piston. The spool-shaped control member 36 is adapted to be manually positioned axially of the power piston C by means of the control rod E which is suitably retained within the control member 36, and a suitable rubber boot 44 is provided to prevent leakage of air from the chamber 12 to the valve's control chamber 38 past the control rod E. A rubber boot 46 is provided between the end cover plate 48 of the servomotor and the outer end of the control rod E to prevent dirt from entering the servomotor.

The control valve structure D is shown in the drawing in its lapped position wherein both the vacuum and atmospheric valve seats 22 and 24, respectively, are in engagement with the annular poppet structure 16 so as to isolate both the valve's vacuum passages and atmospheric passages from its control chamber 38. In the lapped position of the valve, power piston C will therefore remain stationary.

In the released condition of the control rod E, the atmospheric seat 24 of the control member 36 is biased out of engagement with the spool-shaped poppet member 16 by means of the coil spring 50; so that in the released or deenergized condition of the servomotor, atmospheric pressure is communicated through the valve to the rear opposing chamber 14 to equalize the pressure across the power piston C. A power piston return spring 52 is suitably positioned between the rear end of the servomotor and the displacement plunger B to bias the power piston C into its retracted position into engagement with the end cover plate 48, as shown in FIGURE 1 of the drawings.

According to principles of the present invention there is provided a new and improved reaction producing structure between the displacement plunger B and the control valve structure D which provides a small opposing force to the actuating movement of the valve D—which reaction force is at all times generally proportional to the force that is exerted upon the displacement plunger B by the power piston C. The reaction producing structure F may be formed in several ways; but in the preferred embodiment shown in the drawings is formed by means of a stepped axially extending bore 54 in the rear half of the power piston C. The stepped bore 54 comprises a large diameter chamber 56 which receives the front end of the displacement plunger B, and a small diameter bore 58 which opens into the inner end surface or shoulder 60 at its juncture with its large diameter chamber 56. An annular block of a deformable elastomeric compound 62, which in the preferred embodiment is a type of neoprene rubber, is fitted into the large diameter chamber 56 between the shoulder 60 and the end of the displacement plunger B, with its central opening 64 axially aligned with the control valve structure D. The reaction producing structure F is generally completed by a plunger 66 which may be formed integrally with the control member 36, or may be formed by a separate piece that is interpositioned between the control member 36 and the reaction disc 62.

In the general type of servomotor shown in the drawing, it is desired that the brakes of the vehicle can be operated with manual force alone when vacuum is not available to actuate the servomotor such as occurs during engine stoppage. The control valve structures of the type shown in the drawing are very sensitive, and while they are not exactly delicate, difficulty arises in transferring the degree of force that must be exerted on the push rod E to the power piston C during power failure. According to the teachings of the present invention, the reaction disc 62 is given an annular shape and a projection is provided on one of the control or displacement members 66 and B respectively for transferring force directly from the control member 36 to the displacement plunger B through the reaction disc 62. The manual force transmitting means of the present invention is so proportioned that it does not interfere with the normal operation of the control valve structure, and only becomes effective to deliver manual force to the driven member B subsequent to the time that the control valve is completely actuated and insufficient power is available for the power piston C to adequately drive the driven member B.

In the embodiment shown in FIGURE 1 of the drawings, the end face 68 of the plunger 66 is so formed that it is positioned in the smaller diameter bore 58 a predetermined distance from the shoulder 60 when the atmospheric valve seat 24 is in the lapped position shown in the drawing where it engages the annular poppet structure 16. The predetermined clearance which is provided is sufficient to permit the control member 36 to be moved rearwardly to raise the annular poppet structure 16 from the vacuum valve seat 22 before the front face 68 of the plunger moves in line with the shoulder 60. The end face of the displacement plunger B is provided with an axially extending projection 70 which extends into the central opening 64 of the reaction disc 62, and the projection 70 has an axial length which is slightly less than the uncompressed axial thickness of the reaction disc 62.

In the normal deenergized or at rest position of the servomotor, the control member 36 will be biased to the left of the position shown in FIGURE 1 so that its front flange engages the stop 72, and the atmospheric valve seat 24 is out of engagement with the front flange 20 of the poppet structure 16. In this at rest position of the valve structure, atmospheric pressure from the front opposing power chamber 12 is communicated through the passageway 34, past the atmospheric valve seat 24 to the control passages 42 leading to the rear opposing power chamber 14. When the control rod E is depressed to actuate the servomotor, the control member 36 is moved forwardly to engage the front flange 20 of the poppet structure 16, and continued movement thereafter lifts the front flange 20 out of engagement with the vacuum valve seat 22 thereby closing off the atmospheric valve port and communicating vacuum to the rear opposing power chamber 14. During this valve actuating movement, the front face 68 of the plunger 66 will not have moved coincident with the shoulder 60 so as to engage the reaction disc 62 so that no resistance will be offered to the actuating movement of the valve structure at this time. Inasmuch as the clearance between the end of the projection 70 and the control member 66 is greater than that between the end face of the control member and the reaction disc 62, a void will exist between the projection 70 and the control member 66. As vacuum flows to the rear opposing power chamber 14, power piston C will start to move rearwardly until it catches up with the rearward movement of the control member 36 at which time the vacuum valve seat 22 will move up into engagement with the front flange 20 of the annular poppet structure 16 and thereby prevent further vacuum communication with the rear opposing power chamber 14. During this rearward movement of the power piston C, resistance is encountered by the displacement plunger B as it builds up pressure within the hydraulic chamber; so that the reaction disc 62 is deformed into the end of the small diameter bore 58 until it engages the end face 68 of the reaction plunger 66 and then fills up the void between the projection 70 and the control plunger. Inasmuch as the cross sectional area of the small diameter bore 58 is less than (about half) that of the original annular area of the reaction disc 62 abutted by driven member B, movement of the front face of the reaction disc 62 proceeds forwardly into the small diameter bore 58 at a faster rate than its rear face is moved by the displacement plunger B so that the projection 70 does not touch the displacement plunger 66 during power operation.

When it is desired to release the brakes of the vehicle, force on the push rod E is decreased, whereupon the force exerted through the reaction plunger 66 and the valve return spring 30 permits the atmospheric valve seat 24 to move forwardly out of engagement with the flange 20 of the poppet structure 16 to thereby admit air through the passageways 34, 40 and 42 to the rear opposing power chamber 14—thereby decreasing the differential pressure across the power piston C to permit the pressure within the hydraulic chamber and the power piston return spring 52 to force the power piston forwardly. If it is desired to prevent complete release of the brakes, forward movement of the control rod E is stopped whereupon the valve structure moves into the lapped position previously described; and if it is desired to completely release the brakes, the force on the control rod E is completely removed whereupon the atmospheric valve seat 24 of the spool-shaped poppet member 36 remains out of engagement with the flange 20 and the rear opposing power chamber 14 assumes full atmospheric pressure. When this occurs, the power piston C and the displacement rod B will assume the position shown in the drawing.

When it is desired to operate the brakes manually during power failure, the control rod E is forced rearwardly past the position shown in the drawing until the end face of the control plunger 66 moves into engagement with the reaction disc 62. At this time the end of the projection 70 is preferably out of engagement with the end face of the control plunger 66 and further movement of the control rod E to the right deforms and pressurizes the reaction disc 62 so as to deliver some force to the displacement plunger B. Movement of the end face of the control plunger 66 into the reaction disc 62 causes the outer periphery of the reaction disc 62 to expand somewhat and force the shoulder 60 of the power piston C away from the end of the displacement plunger B so as to now permit the end of the projection 70 to move up into engagement with the end face of the control plunger 66 and thereafter permit the manual force to be transmitted by metal-to-metal contact between the control plunger 66 and the projection 70.

The embodiment shown in FIGURE 2 of the drawings corresponds generally to that shown in FIGURE 1; but differs principally in that its projection 70' extends all the way through the reaction disc 62' and projects into an opening 74 in the control member 66'. Those parts of FIGURE 2 which are similar to corresponding parts in FIGURE 1 are designated by like reference numerals and are characterized further in that a prime mark is affixed thereto. As in the previous embodiment, the projection 70' may be provided on either of the control or displacement members 66' or B', and of course the opening 74 is provided in the other of the members. In the embodiment shown in FIGURE 2, the projection 70' preferably has a length so that it projects into the opening 74 when the flange 36' of the control member 66' is in engagement with the shoulder 72' and just sufficient force is exerted on the displacement member B' to hold it in engagement with the reaction disc 62'. The hole 74 is preferably of such a depth that in the uncompressed state of the reaction disc 62' and lapped position of the control valve E', shown in the drawing, more clearance exists between the bottom of the hole 74 and the end of the projection 70' than exists between the annular end surface of the control member 66' and the reaction disc 62'. The clearance between the bottom of the hole 74 and projection 70' is preferably such that on manual applications of the servomotor, the annular end of the control member 66' moves a sufficient distance into the reaction disc 62' to build up an appreciable resistance to further movement before the projection 70' contacts the bottom of the hole 74. By this expediency, metal-to-metal contact only occurs during manual applications, and the speed of engagement is reduced to the point where "clicking" noises produced by the metal-to-metal contact of the parts is no longer objectionable.

While the invention has been described in considerable detail, I do not wish to be limited to the particular construction shown and described; and it is my intention to cover hereby all novel adaptations, modifications and arrangements thereof which come within the practice of those skilled in the art to which the invention relates and which come within the scope of the following claims.

I claim:

1. In a reaction producing device: a body structure having large and small diameter axially aligned chambers with a shoulder at their juncture, an annular block of rubber-like deformable material in said large diameter chamber adjacent said shoulder, said annular block having a generally axially extending central opening therein, a force transmitting member closing off said large diameter chamber for abutting said annular block, a reaction member closing off said small diameter chamber and having an end face for abutting said deformable material, the end face of one of said members having an axially extending projection extending at least part way through the central opening of said annular block for transmitting abutment force to the other of said members.

2. In a reaction producing device: a body structure having large and small diameter axially aligned chambers with a shoulder at their juncture, an annular block of rubber-like deformable material in said large diameter chamber adjacent said shoulder, said annular block having a generally axially extending central opening therein, a force transmitting member closing off said large diameter chamber for abutting said annular block, a reaction member closing off said small diameter chamber and having an end face for abutting said deformable material, the end face of one of said members having an axially extending projection extending at least part way through the central opening of said annular block for abutment with the other of said members, said projection having a length which is a predetermined distance less than the normal axial thickness of said annular block of deformable material.

3. In a reaction producing device: a body structure having large and small diameter axially aligned chambers with a shoulder at their juncture, an annular block of rubber-like deformable material in said large diameter chamber adjacent said shoulder, said annular block having a generally axially extending central opening therein, a force transmitting member closing off said large diameter chamber for abutting said annular block, a reaction member closing off said small diameter chamber and having an end face for abutting said deformable material, there normally being a predetermined clearance between said block of deformable material and one of said members, one of said members having a projection and the other of said members having an opening therein which receives said projection, said projection extending through the central opening of said annular block of rubber like material into the opening in the other of said members and there normally being more clearance between said projection and the bottom of said opening in said other member than there is between said block of deformable material and said members.

4. In a servomotor: a driven member and a power actuated member axially aligned therewith, one of the power actuated and driven members having an axially positioned large diameter chamber into which the other projects; said power actuated member having an end surface in said chamber into which an axially positioned smaller diameter chamber opens; an annular block of rubber-like deformable material in said large diameter chamber between said members, said annular block having a generally axially extending central opening therein, a manually actuated plunger in said small diameter chamber having an end face for abutment with said deformable material, one of said driven and plunger members having a projection extending into the central opening of said deformable material, control means operated by said manually operated member and having a first position causing said power actuated member to retract in the opposite direction from said driven member, a lapped position wherein said power actuated member is caused to remain stationary, and a third position spaced toward said driven member from said other positions and wherein said power actuated member drives said driven member, said plunger having a first predetermined clearance between its end face and said shoulder when said control means is in its lapped position and said projection having a second predetermined clearance with respect to the other of said driven and plunger members when said control means is in its lapped position, said second predetermined distance being greater than said first predetermined distance.

5. In a servomotor: a driven member and a power actuated member axially aligned therewith, one of the power actuated and driven member having an axially positioned large diameter chamber into which the other projects; said power actuated member having an end surface in said chamber into which an axially positioned smaller diameter chamber opens; an annular block of rubber-like deformable material in said large diameter chamber between said members, said annular block having a generally axially extending central opening therein, a manually actuated plunger in said small diameter chamber having an end face for abutment with said deformable material, one of said driven and plunger members having a projection extending through the central opening of said deformable material and the the other of said driven and plunger members having an opening therein receiving said projection, control means operated by said manually operated member and having a first position causing said power actuated member to retract in the opposite direction from said driven member, a lapped position wherein said power actuated member is caused to remain stationary, and a third position spaced toward said driven member from said other positions and wherein said power actuated member drives said driven member, said plunger having a first predetermined clearance between its end face and said shoulder when said control means is in its lapped position and said projection having a second predetermined clearance with respect to the bottom of said opening in said other one of said driven and plunger members when said control means is its lapped position, said second predetermined distance being greater than said first predetermined distance.

6. In a servomotor: axially aligned manually operated, power actuated and driven members; said power member having an axially positioned large diameter chamber into which said driven member projects; said power actuated member also having an axially positioned smaller diameter chamber opening into said large diameter chamber with a shoulder at their juncture; an annular block of rubber-like deformable material in said large diameter chamber between said members, said annular block having a generally axially extending central opening therein, a plunger in said small diameter chamber actuated by said manually operated member and having an end face for abutment with said deformable material, one of said plunger and driven members having a projection extending into the central opening of said deformable material, control means operated by said manually operated member and having a first position causing said power actuated member to retract in the opposite direction from said driven member, a lapped position wherein said power actuated member is caused to remain stationary, and a third position spaced toward said driven member from said other positions and wherein said power actuated member drives said driven member, said plunger having a first predetermined clearance between its end face and said shoulder when said control means is in its lapped position and said projection having a second predetermined clearance with respect to the other of said plunger and driven members when said control means is in its lapped position, said second predetermined distance being greater than said first predetermined distance.

No references cited.